United States Patent Office 2,969,054
Patented Jan. 24, 1961

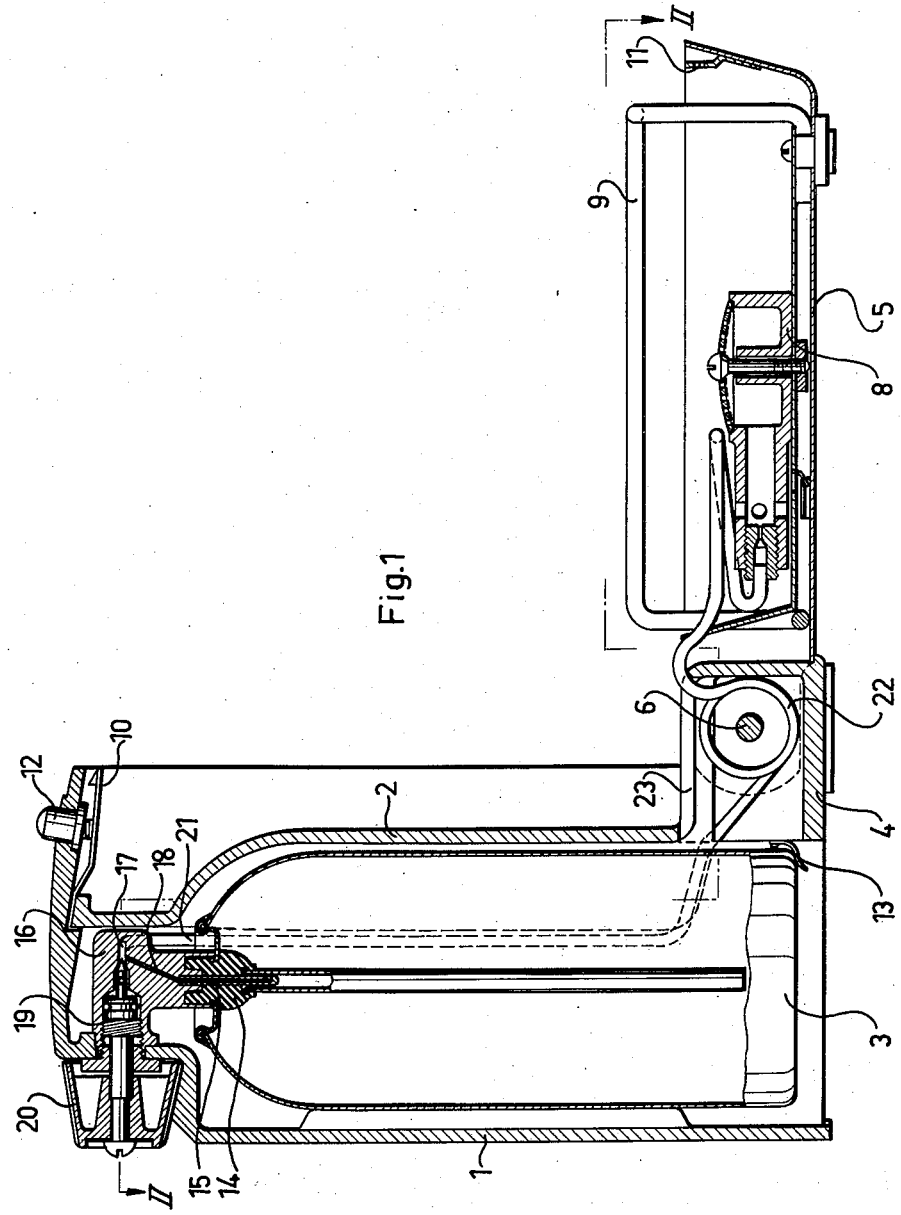

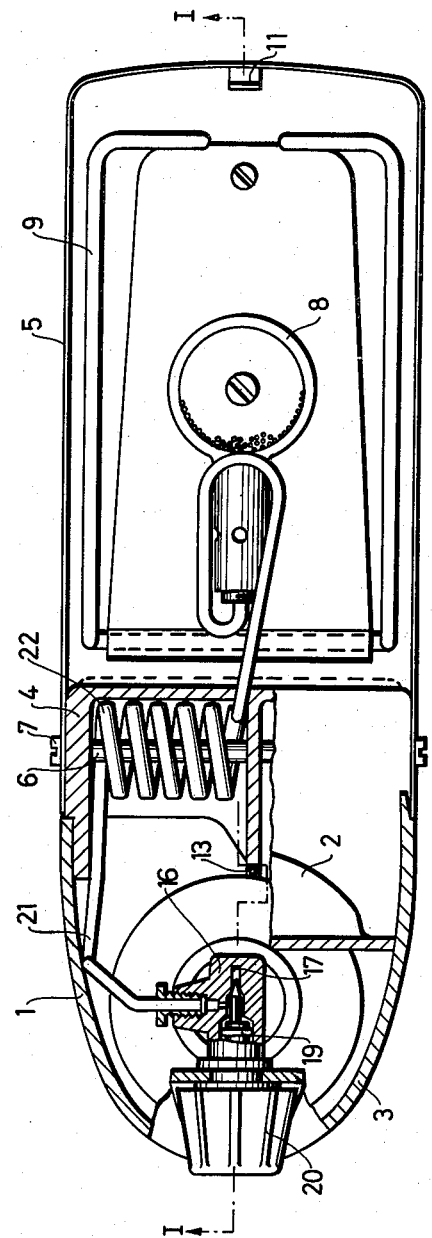

2,969,054
COOKING APPLIANCES BURNING A GASEOUS FUEL

Sten Sune Axelsson, Hagalund, Sweden, assignor to Aktiebolaget Bahco, Stockholm, Sweden, a corporation of Sweden Filed Dec. 2, 1958, Ser. No. 777,745

Claims priority, application Sweden Dec. 5, 1957

1 Claim. (Cl. 126—38)

The present invention relates to cooking appliances burning a gaseous fuel which is stored under pressure in a container, e.g. in a liquified state. The invention is concerned with a cooking appliance of this type in which a casing houses the gas container and, when the appliance is not in use, also the burner and associated parts which are arranged on a pivotable support which is swung out when the cooking appliance is to be used so that a cooking vessel can be placed thereon.

The object of the invention is to permit the use of a gas conduit of an essentially rigid material between the gas container and the burner without necessitating special couplings in order to permit the above-mentioned swinging movement of the support. Such couplings are unsuitable in connection with a gaseous fuel stored under pressure since they may easily cause leakage.

This object is achieved in accordance with this invention by the provision of a gas conduit which extends spirally or helically one or more turns around the pivotal axis of the support.

An embodiment of the invention is illustrated by way of example on the accompanying drawings, where:

Figures 1 and 2 illustrate in vertical longitudinal cross-section and in horizontal section, respectively, a cooking appliance embodying the principles of this invention, the appliance being shown with the support in the operative position. The sections are taken along lines I—I in Figure 2 and II—II in Figure 1 respectively.

Referring to the drawings, the cooking appliance illustrated thereon comprises a casing 1 which is open at its bottom and at one side thereof, while the opposite side is substantially semicircularly rounded. The rounded wall defines together with a partition 2 attached to the casing 1 a chamber wherein a gas bottle 3 can be positioned. The partition 2 has at its lower end a projecting portion 4 to which a box-like member 5 is pivotally attached by means of a rod 6 and screws 7. The box-like member 5 serves as a support for a burner 8 and a stand 9 on which the cooking vessel is placed when the member 5 is swung out as shown on the drawings. When swung up, the box-like member 5 closes the open side of the casing 1, the burner 8 and the stand 9 being then accommodated between the partition 2 and the box 5. In the latter position, the member 5 is locked to the casing 1 by means of a locking spring 10 which cooperates with an abutment 11 on the member 5. To open the cooking appliance the locking spring 10 is actuated by means of a spring biased push-button 12.

The gas bottle 3 which is introduced from below into the chamber defined by the casing 1 and the partition 2 and is held in position therein by a holding member 13, has a rubber stopper 14 which when the bottle is positioned is penetrated by a hollow needle 15 secured to a valve assembly 16 provided in the top portion of the casing 1, whereby the interior of the bottle 3 is placed in communication with the valve chamber 17 through the needle 15 and a passage 18. The valve assembly comprises a valve body 19 operated by a knob 20. When the valve is opened, the gas flows from the valve assembly 16 to the burner 8 through a pipe 21 which extends downwardly from the valve assembly within the chamber defined by the casing 1 and the partition 2 and then into the projecting portion 4 of the partition 2 where the pipe is wound helically several turns around the rod 6, as seen at 22, whereupon the pipe extends through a slot 23 in the roof of the portion 4 and then to the burner 8. Suitably, the pipe is flattened within the helical portion 22, as seen on the drawings, in order to facilitate bending thereof in the swinging movement of the support 5. The pipe may be wound so that the helical portion thereof serves as a helical spring to swing out the box-like member 5 once the button 12 is depressed.

The embodiment shown and described is capable of many variations and modifications without departing from the spirit and scope of the claims:

I claim:

In a cooking appliance for burning a gaseous fuel, the combination comprising an upright casing, a gas container housed within said casing, a burner, a support underlying said burner and extending horizontally from the base of said casing and pivotally connected thereto for swinging movement about a horizontal axis from a horizontal open position to an upright closed position thereby to coact with said casing for enclosing said burner, a resilient tubular conduit interconnecting said gas container and burner for supplying fuel to the latter, said tubular conduit including a conduit section spirally wound about the axis of the pivotal connection between said casing and support, said conduit being operative to yieldably hold said support in open position for exposing said burner, and being operative to return said support to its open position when said support is turned about said pivotal axis to its closed position against the influence of the inherent resilience of said conduit and then released.

References Cited in the file of this patent

UNITED STATES PATENTS

| | | |
|---|---|---|
| 2,021,651 | Cutmann | Nov. 19, 1935 |
| 2,217,750 | Hockenstrom | Oct. 15, 1940 |